(12) United States Patent
Miwa et al.

(10) Patent No.: US 11,293,694 B2
(45) Date of Patent: Apr. 5, 2022

(54) AUXILIARY BURNER FOR ELECTRIC FURNACE

(71) Applicant: JFE STEEL CORPORATION, Tokyo (JP)

(72) Inventors: Yoshihiro Miwa, Tokyo (JP); Koichi Tsutsumi, Tokyo (JP); Sumito Ozawa, Tokyo (JP); Ikuhiro Sumi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 253 days.

(21) Appl. No.: 16/342,413

(22) PCT Filed: Sep. 27, 2017

(86) PCT No.: PCT/JP2017/035062
§ 371 (c)(1),
(2) Date: Apr. 16, 2019

(87) PCT Pub. No.: WO2018/074166
PCT Pub. Date: Apr. 26, 2018

(65) Prior Publication Data
US 2019/0249922 A1 Aug. 15, 2019

(30) Foreign Application Priority Data
Oct. 21, 2016 (JP) .............................. JP2016-207050

(51) Int. Cl.
*F27B 3/08* (2006.01)
*F23C 1/12* (2006.01)
(Continued)

(52) U.S. Cl.
CPC ............... *F27B 3/085* (2013.01); *F23C 1/12* (2013.01); *F23D 14/22* (2013.01); *F23L 7/007* (2013.01)

(58) Field of Classification Search
CPC .. F23C 1/12; F23C 3/002; F27B 3/085; F23D 14/22; F23L 7/007
See application file for complete search history.

(56) References Cited

U.S. PATENT DOCUMENTS 4,928,605 A * 5/1990 Suwa ...................... F23D 14/32
431/11
5,590,151 A 12/1996 Forestier
(Continued)

FOREIGN PATENT DOCUMENTS

CN 1109690 A 10/1995
GB 2165633 A 4/1986
(Continued)

OTHER PUBLICATIONS

Dec. 5, 2017, International Search Report issued in the International Patent Application No. PCT/JP2017/035062.
(Continued)

*Primary Examiner* — Joel M Attey
*Assistant Examiner* — Adam Michael Eckardt
(74) *Attorney, Agent, or Firm* — Kenja IP Law PC (57) ABSTRACT

Provided is an auxiliary burner for an electric furnace that has high iron scrap heating effect by appropriately and efficiently burning a solid fuel such as coal together with a gas fuel. An auxiliary burner for an electric furnace 100 has a structure in which a solid fuel injection tube 1, a gas fuel injection tube 2, and a combustion-supporting gas injection tube 3 are coaxially arranged in order from the center. The front end of the solid fuel injection tube 1 is located inside the gas fuel injection tube 2 to form, between the front end of the solid fuel injection tube 1 and the front end of the gas fuel injection tube 2, a first space 4 for solid fuel and gas fuel premixing surrounded by the front end portion of the gas fuel injection tube 2.

12 Claims, 4 Drawing Sheets

(51) Int. Cl.
*F23L 7/00* (2006.01)
*F23D 14/22* (2006.01)

(56) References Cited

U.S. PATENT DOCUMENTS 5,714,113 A * 2/1998 Gitman ................. C21C 5/4606
266/182
6,752,620 B2 * 6/2004 Heier ...................... F23D 17/00
110/347

FOREIGN PATENT DOCUMENTS

| | | |
|---|---|---|
| JP | H109524 A | 1/1998 |
| JP | 2003004382 A | 1/2003 |
| JP | 2008209081 A | 9/2008 |
| JP | 2012189311 A | 10/2012 |
| WO | 2016120943 A1 | 8/2016 |

OTHER PUBLICATIONS

Oct. 2, 2018, Notification of Reasons for Refusal issued by the Japan Patent Office in the corresponding Japanese Patent Application No. 2017-564755 with English language Concise Statement of Relevance.

Apr. 2, 2019, Decision of Refusal issued by the Japan Patent Office in the corresponding Japanese Patent Application No. 2017-564755 with English language concise statement of relevance.

Oct. 11, 2019, Office Action issued by the China National Intellectual Property Administration in the corresponding Chinese Patent Application No. 201780065078.3 with English language search report.

* cited by examiner

AUXILIARY BURNER FOR ELECTRIC FURNACE

TECHNICAL FIELD

The present disclosure relates to an auxiliary burner attached to an electric furnace for manufacturing molten iron by melting iron scrap.

BACKGROUND

When melting iron scrap using an electric furnace, the iron scrap around the electrode melts quickly; and the iron scrap located away from the electrode, that is, the iron scrap at cold spots melts slowly, resulting in inhomogeneity in melting speed of the iron scrap in the furnace. For this reason, the operating time of the whole furnace has been limited by the melting speed of the iron scrap at the cold spots.

Therefore, in order to solve the inhomogeneity in melting speed of such iron scrap and to melt the iron scrap in the whole furnace in a well-balanced manner, a method of installing auxiliary burners at the cold spots to preheat, cut, and melt the iron scrap located at the cold spots has been adopted.

As such an auxiliary burner, for example, JPH10-9524A (PTL 1) proposes an auxiliary burner having a triple tube structure that ejects oxygen gas for splattering incombustibles and cutting iron scrap from a center part, ejects fuel from the outer circumference of the oxygen gas, and ejects oxygen gas for combustion from the outer circumference of the fuel. This auxiliary burner is a high-speed pure oxygen auxiliary burner for an electric furnace in which a reduced part is provided on the tip of the oxygen gas ejection tube at the center part so as to increase the speed of the oxygen gas to be ejected from the center part, and swirl vanes are installed in an annular space formed by the fuel ejection tube and the combustion oxygen gas ejection tube so as to swirl the oxygen gas for combustion to be ejected from the outermost circumference.

Additionally, JP2003-004382A (PTL 2) proposes a burner facility for an electric furnace that spreads the directivity of the burner flame over a wide range by eccentrically placing the nozzle tip of the auxiliary burner and rotating the burner.

CITATION LIST

Patent Literature

PTL 1: JPH10-9524A
PTL 2: JP2003-004382A

SUMMARY

Technical Problem

By using the techniques described in PTL 1 and PTL 2, it is possible to efficiently preheat and melt iron scrap using an auxiliary burner. However, in PTL 1 and PTL 2, there is a problem that the fuel to be used is restricted to expensive gas fuel. Examples of inexpensive fuel include solid fuels such as coal. Inexpensive fuels include solid fuels such as coal (pulverized coal). A heating time is necessary for ignition of a solid fuel. With a conventional auxiliary burner, it is difficult to burn a solid fuel faster than a gas fuel. This causes unstable combustion, and leads to misfiring depending on conditions. Besides, if the particle size of the pulverized coal is large, the coal does not burn completely in the flame of the burner, and unburned coal is discharged to the outside of the electric furnace by dust collection equipment. This causes very poor thermal efficiency. Thus, with the conventional techniques, it is difficult to use a solid fuel such as coal in an auxiliary burner.

It could therefore be helpful to provide an auxiliary burner for an electric furnace capable of increasing the heating effect of iron scrap by suitably and efficiently burning solid fuel such as coal along with gas fuel.

Solution to Problem

As a result of repeated study on an auxiliary burner for an electric furnace that can use a solid fuel such as coal, we discovered that the combustibility of solid fuel can be enhanced and the scrap heating effect can be improved by, in a basic structure in which a solid fuel injection tube, a gas fuel injection tube, and a combustion-supporting gas injection tube are coaxially arranged in order from the center, premixing a solid fuel and a gas fuel in a burner front end portion (gas discharge portion) so that the premixed solid fuel and gas fuel come into contact with a combustion-supporting gas and burn, that is, locating the front end of the solid fuel injection tube inside the gas fuel injection tube to form, between the front end of the solid fuel injection tube and the front end of the gas fuel injection tube, a space for solid fuel and gas fuel premixing surrounded by the front end portion of the gas fuel injection tube.

The present disclosure was completed on the basis of such findings. We thus provide:

[1] An auxiliary burner for an electric furnace for manufacturing molten iron by melting iron scrap, which is attached to the electric furnace and uses a gas fuel and a solid fuel as fuel, comprising: a solid fuel injection tube defining a first flow path through which the solid fuel passes and configured to inject the solid fuel from a tip of the first flow path; a gas fuel injection tube arranged around the solid fuel injection tube, defining a second flow path through which the gas fuel passes between the gas fuel injection tube and an outer wall of the solid fuel injection tube, and configured to inject the gas fuel from a tip of the second flow path; and a combustion-supporting gas injection tube arranged around the gas fuel injection tube, defining a third flow path through which a combustion-supporting gas passes between the combustion-supporting gas injection tube and an outer wall of the gas fuel injection tube, and configured to inject the combustion-supporting gas from a tip of the third flow path, wherein a front end of the solid fuel injection tube is located inside the gas fuel injection tube to form, between the front end of the solid fuel injection tube and a front end of the gas fuel injection tube, a first space for solid fuel and gas fuel premixing surrounded by a front end portion of the gas fuel injection tube.

[2] The auxiliary burner for an electric furnace according to [1], wherein $0.2 \leq L/D \leq 1.5$, where L is a length of the first space in a burner axis direction, and D is a discharge port diameter of the solid fuel injection tube.

[3] The auxiliary burner for an electric furnace according to [1] or [2], wherein the front end of the gas fuel injection tube is located inside the combustion-supporting gas injection tube to form, between the front end of the gas fuel injection tube and a front end of the combustion-supporting gas injection tube, a second space for flame holding surrounded by a front end portion of the combustion-supporting gas injection tube.

[4] An electric furnace comprising the auxiliary burner for an electric furnace according to any one of [1] to [3].

[5] A method of producing molten iron, the method comprising: melting iron scrap in an electric furnace including the auxiliary burner for an electric furnace according to any one of [1] to [3], to obtain molten iron.

Advantageous Effect

The auxiliary burner for an electric furnace according to the present disclosure can efficiently burn a solid fuel together with a gas fuel at a high combustion rate, and thus has high iron scrap heating effect. The auxiliary burner can therefore efficiently heat or melt iron scrap using an inexpensive solid fuel such as coal. This reduces power usage and operation time in electric furnace operation.

DETAILED DESCRIPTION

An auxiliary burner for an electric furnace according to the present disclosure is an auxiliary burner that is attached to an electric furnace for melting iron scrap to produce molten iron, and uses gas fuel and solid fuel as fuel. The auxiliary burner has a basic structure in which a solid fuel injection tube, a gas fuel injection tube, and a combustion-supporting gas injection tube are coaxially arranged in order from the center, and, in the basic structure, premixes the solid fuel and the gas fuel in a burner front end portion (gas discharge portion) so that the premixed solid fuel and gas fuel come into contact with (i.e. mix with) a combustion-supporting gas and burn. Specifically, the front end of the solid fuel injection tube is located inside the gas fuel injection tube to form, between the front end of the solid fuel injection tube and the front end of the gas fuel injection tube, a space for solid fuel and gas fuel premixing surrounded by the front end portion of the gas fuel injection tube. The auxiliary burner for an electric furnace according to the present disclosure premixes the solid fuel and the gas fuel before coming into contact with (i.e. mixing with) the combustion-supporting gas, in the burner front end portion (gas discharge portion). This allows the solid fuel to burn efficiently at a high combustion rate. The auxiliary burner thus has high scrap heating effect, and can efficiently heat or melt iron scrap.

Elements necessary for combustion include combustible substance, oxygen, and temperature (fire source). Regarding the state of the combustible substance, the ease of combustion is in the order of gas, liquid and solid. This is because when the combustible substance is in a gaseous state, it is easy to mix the combustible substance with oxygen such that the combustion is continued (chain reaction).

When a gas fuel is burned as a combustible substance using an auxiliary burner, generally, the gas fuel burns immediately after being injected from the tip of the burner, although it depends on the oxygen concentration, the flow speed of the gas fuel, and the shape of the burner tip. On the other hand, when a solid fuel typified by coal is used as a combustible substance, it is difficult for it to burn as quickly as a gas fuel. This is due to the fact that it is necessary to maintain the ignition temperature of the solid fuel, which is about 400° C. to 600° C. in the case of coal, and it takes time to raise the temperature up to the ignition temperature.

The heat-up time for a solid fuel to reach its ignition temperature depends on the particle size (specific surface area) of the solid fuel, and it is possible to shorten the ignition time by making the particles finer. This is because combustion reaction proceeds by maintaining the ignition temperature and reacting the combustible substance with oxygen. In order to efficiently proceed the combustion reaction, it is important to heat the solid fuel efficiently and cause prompt reaction between the heated solid fuel and oxygen. The auxiliary burner according to the present disclosure can efficiently heat the solid fuel and cause prompt reaction between the heated solid fuel and oxygen, by premixing the solid fuel and the gas fuel in the burner front end portion.

Hereinafter, an example in which LNG (Liquefied Natural Gas) as the gas fuel, coal (pulverized coal) as the solid fuel, and pure oxygen as the combustion-supporting gas are used is described. Note that the ignition temperature of fuel is generally solid fuel>liquid fuel>gas fuel.

When LNG and coal are used as the fuel of the auxiliary burner, a temperature field above the ignition temperature of coal is created due to the combustion of LNG and pure oxygen, and as the coal is fed into the temperature field, the temperature of the coal rises to the ignition temperature, and thus combustion of the coal (vaporization ignition) occurs. Although the flame temperature drops due to the fact that the amount of heat required to raise the temperature of the coal is consumed, the temperature rises in the region where ignition of the coal occurs.

The reaction of LNG and coal as the fuel and oxygen generates carbon dioxide, an incombustible gas. An incombustible gas inhibits continuation of combustion (chain reaction), which causes deterioration in combustibility. Further, the coal is supplied along with a carrier gas. When the flow rate of the carrier gas is high, the temperature drops corresponding to the specific heat of the carrier gas. Therefore, generally, the combustibility can be improved by increasing the solid-gas ratio (solid supply rate per unit time/carrier gas supply rate per unit time). However, the state in which the solid-gas ratio is large is such that the coal is dense, and it is difficult for external heat and reaction with oxygen to be transmitted to the center part. In order to efficiently burn the coal, it is important to create a condition under which heat and oxygen are sufficiently present around the coal in the combustion field of the coal. The auxiliary burner according to the present disclosure feeds coal into the combustion field in a state of being premixed with LNG. Therefore, heat by reaction between LNG and oxygen is efficiently transferred to coal, and coal is promptly heated to its ignition temperature. The combustibility of coal can thus be improved.

Figure 1:
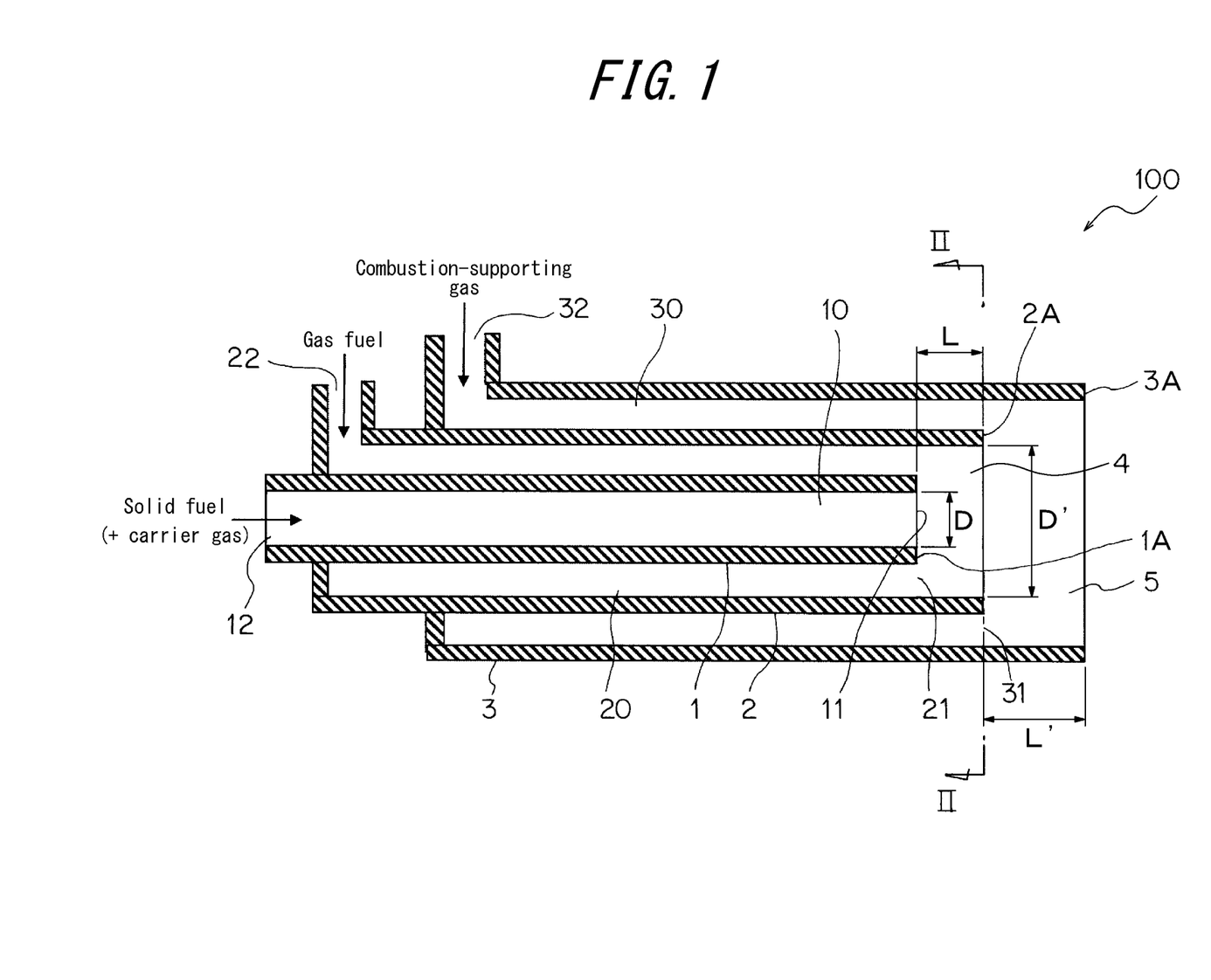
FIG. 1 is a cross-sectional view taken along the burner axis of an auxiliary burner 100 for an electric furnace according to an embodiment of the present disclosure.
Figure 2:
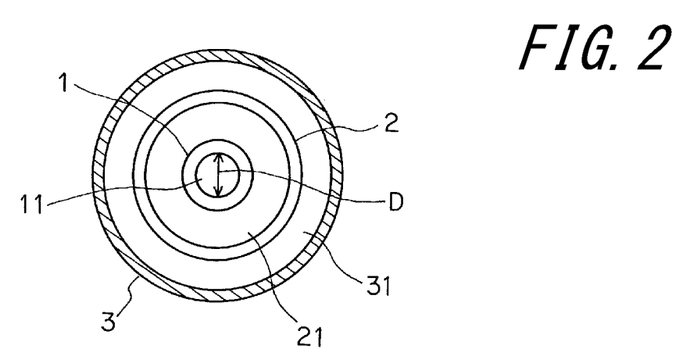
FIG. 2 is a cross-sectional view taken along line II-II of FIG. 1.

FIGS. 1 and 2 illustrate an auxiliary burner for an electric furnace 100 according to one of the disclosed embodiments. FIG. 1 is a cross-sectional view along the burner axis. FIG. 2 is a cross-sectional view along line II-II of FIG. 1.

In the auxiliary burner 100, the body part for supplying fuel and combustion-supporting gas has a triple tube structure in which a solid fuel injection tube 1, a gas fuel injection tube 2, and a combustion-supporting gas injection tube 3 are arranged coaxially in the stated order from the center side. The solid fuel injection tube 1 defines a solid fuel flow path 10 (first flow path) through which solid fuel passes, and injects solid fuel from a circular solid fuel discharge port 11 which is the tip of the solid fuel flow path 10. The gas fuel injection tube 2, which is arranged around the solid fuel injection tube 1, defines a gas fuel flow path 20 (second flow path) through which gas fuel passes between the gas fuel injection tube 2 and the outer wall of the solid fuel injection tube 1, and injects gas fuel from a ring-shaped gas fuel discharge port 21 which is the tip of the gas fuel flow path 20. The combustion-supporting gas injection tube 3, which is arranged around the gas fuel injection tube 2, defines a combustion-supporting gas flow path 30 (third flow path) through which combustion-supporting gas passes between the combustion-supporting gas injection tube 3 and the outer wall of the gas fuel injection tube 2, and injects combustion-supporting gas from a ring-shaped combustion-supporting gas discharge port 31 which is the tip of the combustion-supporting gas flow path 30.

The inner diameter of each of the injection tubes 1, 2 and 3 is not particularly limited; and generally, the inner diameter of the solid fuel injection tube 1 is about 10 mm to 40 mm, the inner diameter of the gas fuel injection tube 2 is about 20 mm to 60 mm, and the inner diameter of the combustion-supporting gas injection tube 3 is about 40 mm to 100 mm. Also, the thickness of each injection tube is not particularly limited, and is generally about 2 mm to 20 mm.

In this basic structure, the front end 1A of the solid fuel injection tube 1 is located inside the gas fuel injection tube 2 to form, between the front end 1A of the solid fuel injection tube 1 and the front end 2A of the gas fuel injection tube 2, a first space 4 for solid fuel and gas fuel premixing surrounded by the front end portion of the gas fuel injection tube 2. The first space 4 is supplied with the solid fuel from the solid fuel discharge port 11 which is the open end of the solid fuel flow path 10 and the gas fuel from the gas fuel discharge port 21 which is the open end of the gas fuel flow path 20, so that the solid fuel and the gas fuel are premixed in the first space 4. The first space 4 is surrounded by the front end portion of the gas fuel injection tube 2, and therefore the gas fuel is kept from diffusing. This facilitates mixing of the solid fuel and the gas fuel, and allows substantial amounts of the solid fuel and the gas fuel to be premixed in the first space 4.

As an index representing the solid fuel and gas fuel premixing effect, L/D obtained by dividing the length L of the first space 4 in the burner axis direction by the discharge port diameter D of the solid fuel discharge port 11 of the solid fuel injection tube 1 is used. The discharge port diameter D is determined as appropriate depending on a given discharge flow rate and discharge rate of the solid fuel (carrier gas). The premixing property changes when the length L is changed with respect to the discharge port diameter D, for example, as follows:

In the case where L is excessively short: the time and region for premixing the solid fuel and the gas fuel are hard to be secured, and therefore the premixing effect is insufficient.

In the case where L is appropriate: the solid fuel and the gas fuel are premixed, and the combustibility of the solid fuel is improved.

In the case where L is excessively long: the flame is excessively close to the burner front end portion, and the burner front end portion is susceptible to erosion.

The length L of the first space 4 in the burner axis direction is not limited, but preferably satisfies $0.2 \leq L/D \leq 1.5$ with the discharge port diameter D of the solid fuel discharge port 11 of the solid fuel injection tube 1. If L/D is less than 0.2, the time and region for premixing the solid fuel and the gas fuel are hard to be secured, so that the premixing effect may be insufficient. Therefore, L/D is preferably 0.2 or more, and more preferably 0.6 or more. In terms of premixing, L/D is preferably higher. If L/D is excessively higher, however, the burner front end portion is susceptible to erosion by the flame. If L/D is more than 1.5, the degree of erosion is likely to be high. Therefore, L/D is preferably 1.5 or less, and more preferably 1.0 or less.

Moreover, the front end 2A of the gas fuel injection tube 2 is preferably located inside the combustion-supporting gas injection tube 3 to form, between the front end 2A of the gas fuel injection tube 2 and the front end 3A of the combustion-supporting gas injection tube 3, a second space 5 for flame holding surrounded by the front end portion of the combustion-supporting gas injection tube 3. The second space 5 is supplied with the premixed solid fuel and gas fuel from the first space 4 and the combustion-supporting gas from the combustion-supporting gas discharge port 31 which is the open end of the combustion-supporting gas flow path 30. In the second space 5 and its downstream region, the solid fuel and the gas fuel come into contact with (i.e. mix with) the combustion-supporting gas and burn.

The length L' of the second space 5 in the burner axis direction is not limited, but preferably satisfies $0.1 \leq L'/D' \leq 1.2$ with the discharge port diameter D' of the discharge port 21 of the gas fuel injection tube. With this length L' of the second space 5 in the burner axis direction, circulating flow forms in the second space 5, thus producing a flame holding effect. The flame holding effect is an effect of suppressing misfiring of the flame and stabilizing the flame.

In this embodiment, the solid fuel and the gas fuel premixed in the first space 4 come into contact with (i.e. mix with) the combustion-supporting gas and burn. Therefore, heat by the reaction between the gas fuel and the combustion-supporting gas is efficiently transferred to the solid fuel, and the solid fuel is promptly heated to its ignition temperature. The combustibility of coal can thus be improved.

On the rear end side of the burner, a combustion-supporting gas supply port 32, through which combustion-supporting gas is supplied to the combustion-supporting gas flow path 30, is provided on the burner rear end side of the combustion-supporting gas injection tube 3. Similarly, a gas fuel supply port 22, through which gas fuel is supplied to the gas fuel flow path 20, is provided on the burner rear end side of the gas fuel injection tube 2. Also similarly, a solid fuel supply port 12, through which solid fuel is supplied along with carrier gas to the solid fuel flow path 10, is provided on the burner rear end side of the solid fuel injection tube 1.

A combustion-supporting gas supply mechanism (a combustion-supporting gas feeder being not illustrated), which supplies combustion-supporting gas to the combustion-supporting gas supply port 32, is connected to the combustion-supporting gas supply port 32. Also, a gas fuel supply mechanism (a gas fuel feeder being not illustrated), which supplies gas fuel to the gas fuel supply port 22, is connected to the gas fuel supply port 22. Additionally, a solid fuel supply mechanism and a carrier gas supply mechanism (a solid fuel feeder and a carrier gas feeder both being not illustrated), which supply solid fuel and carrier gas to the solid fuel supply port 12, is connected to the solid fuel supply port 12.

Further, although it is not illustrated, an inner tube and an outer tube are further arranged coaxially outside the combustion-supporting gas injection tube 3; and cooling fluid flow paths (a forward path and a return path for cooling fluid) communicating with each other are formed between the outer tube and the inner tube, and between the inner tube and the combustion-supporting gas injection tube 3.

A swirl vane may be placed in the combustion-supporting gas flow path 30 and the gas fuel flow path 20 to provide a swirling flow to the combustion-supporting gas and the gas fuel. As a result of providing a swirling flow to the combustion-supporting gas and the gas fuel, the gas discharged from the burner forms a low-speed swirling flow. This facilitates premixing of the gas fuel and the solid fuel, and facilitates mixing of the premixed gas fuel and solid fuel and the combustion-supporting gas.

[Reason for Setting Combustion-Supporting Gas Injection Tube as the Outermost Circumference]

The combustion-supporting gas has the largest flow rate among the supplied gas amount, and in order to match the flow speed thereof with that of other supplied gases (gas fuel and carrier gas), it is necessary to make the discharge area of the combustion-supporting gas discharge port 31 larger than that of the gas fuel discharge port 21 and the solid fuel discharge port 11. From the above viewpoint, it is optimal to set the combustion-supporting gas injection tube 3 as the outermost circumference. Hereinafter, an example in which oxygen as the combustion-supporting gas, LNG as the gas fuel, and pulverized coal as the solid fuel are used is described.

Initially, the amount of oxygen required for combustion is calculated by the following equation (1):

amount of oxygen required for combustion=oxygen ratio (coefficient)×[flow rate of LNG×theoretical oxygen amount of LNG+supply amount of pulverized coal×theoretical oxygen amount of pulverized coal]  (1).

The amount of oxygen required for combustion is specifically calculated under the following conditions. That is, as calculation conditions, the amount of heat generated by LNG is set to 9700 kcal/Nm$^3$, and the amount of heat generated by pulverized coal, the solid fuel, is set to 7500 kcal/kg. In addition, the total energy of the auxiliary burner is set such that, 90% thereof is supplied by the solid fuel, and 10% thereof is supplied by the gas fuel. For example, when LNG is supplied at 6.2 Nm$^3$/h, the amount of heat generated is 60 Mcal/h. In this case, it is necessary to supply 540 Mcal/h, which is the difference from 600 Mcal/h, the total amount of heat to be generated by the burner, from pulverized coal, and therefore the supply amount of pulverized coal is about 72 kg/h. Further, the theoretical oxygen amount is calculated from the carbon content and the hydrogen content in the fuel; and particularly, the theoretical oxygen amount of LNG is about 2.25 Nm$^3$/Nm$^3$, and the theoretical oxygen amount of pulverized coal is 1.70 Nm$^3$/kg.

Generally, the oxygen ratio is under an oxygen excess condition of 1.0 to 1.1; and when the oxygen ratio is 1.1, the amount of oxygen required for combustion is calculated as 150 Nm$^3$/h ($\approx$1.1×[6.2×2.25+72×1.70]) according to the above equation (1). Accordingly, when pure oxygen is used, about 24 times the flow rate of the LNG is necessary. In addition, compared with nitrogen for carrying the pulverized coal, the nitrogen flow rate is 5.8 Nm$^3$/h when the solid-gas ratio is 12, and therefore, about 26 times the flow rate is necessary. Accordingly, in order to make the discharge speed of oxygen equal to the discharge speed of LNG and pulverized coal, the combustion-supporting gas discharge port 31 needs to have a discharge area (radial cross-sectional area) 20 times or more that of the gas fuel discharge port 21 and the solid fuel discharge port 11. Therefore, in view of the layout of the burner, it is reasonable to arrange the combustion-supporting gas discharge port 31 at the outermost circumferential part of the burner. When air is used instead of pure oxygen as the combustion-supporting gas, a further 5 times the flow rate is necessary. Also in this case, it is reasonable to arrange the combustion-supporting gas discharge port 31 at the outermost circumferential part of the burner for the same reason.

Examples of fuels that can be used in the auxiliary burner of the present embodiment are as follows. Examples of the gas fuel include LPG (Liquefied Petroleum Gas), LNG (Liquefied Natural Gas), hydrogen, steelworks by-product gases (Cokes Oven gas, Blast Furnace gas and the like), and mixed gases including two or more thereof; and one or more thereof can be used. Further, examples of the solid fuel include powdered solid fuels such as coal (pulverized coal) and plastic (granular or powdery ones including waste plastic); and one or more thereof can be used. However, coal (pulverized coal) is particularly preferred. Furthermore, examples of the combustion-supporting gas include pure oxygen (industrial oxygen), oxygen-enriched air, and air; and anyone thereof may be used. However, pure oxygen is preferred. As the carrier gas, for example, nitrogen can be used.

Figure 3:
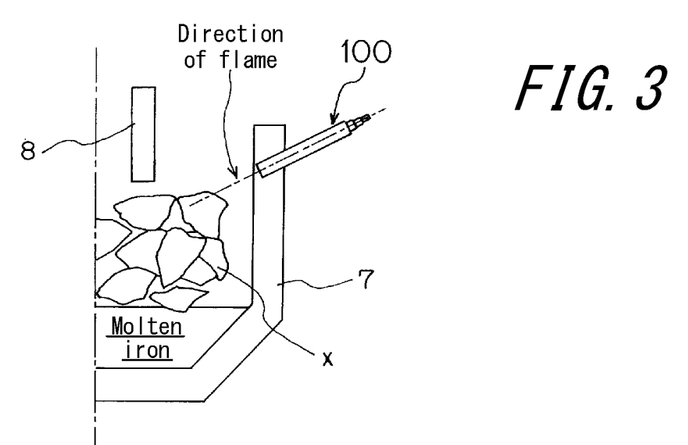
FIG. 3 schematically illustrates an example of working condition of the auxiliary burner 100 for an electric furnace according to the presently disclosed embodiment.

FIG. 3 schematically illustrates an example of working condition of the auxiliary burner 100 of the present embodiment (a longitudinal section in the radial direction of the electric furnace), wherein 7 is a furnace body, 8 is an electrode, 100 is the auxiliary burner, and x is scrap. The auxiliary burner 100 is installed with an appropriate dip angle. Generally, a plurality of auxiliary burners 100 are installed such that the scrap located at the so-called cold spots within the electric furnace can be heated or melted.

Thus, an electric furnace according to the present disclosure includes the auxiliary burner for an electric furnace 100, and may further include the furnace body 7 and the electrode 8. This electric furnace has high iron scrap heating effect. A method of producing molten iron according to the present disclosure includes melting iron scrap in an electric furnace including the auxiliary burner for an electric furnace 100 to obtain molten iron. This method has high iron scrap heating effect.

Typically, an auxiliary burner has a relatively low gas flow rate, and thus its gas discharge port may be clogged due to splashes of scattering molten iron or molten slag. In the auxiliary burner according to this embodiment, such splashes are purged by the carrier gas of the solid fuel, so that the gas discharge port is kept from being clogged by splashes.

EXAMPLES

First Example

A combustion experiment was conducted using auxiliary burners of Examples having the structure illustrated in FIGS. 1 and 2 and an auxiliary burner of Comparative Example having the same basic structure as Examples except not having the first space 4. In Examples, the combustion experiment was conducted with various L/D shown in Table 3 by varying the length L of the first space 4 in the burner axis direction while the discharge port diameter D of the solid fuel injection tube was unchanged. In both Examples and Comparative Example, the second space 5 has dimensions satisfying L'/D'=0.8.

LNG (gas fuel) and pulverized coal (solid fuel) were used as fuels of the auxiliary burner, and pure oxygen was used as the combustion-supporting gas. The pulverized coal was injected from the solid fuel injection tube at the center with nitrogen as the carrier gas, the LNG was injected from the gas fuel injection tube outside the solid fuel injection tube, and the pure oxygen was injected from the combustion-supporting gas injection tube outside the gas fuel injection tube (the outermost circumference). The output and use conditions of the auxiliary burner are shown in Table 1. As the pulverized coal, MDT having the components, lower heating value, and particle size shown in Table 2 was used.

Figure 4:
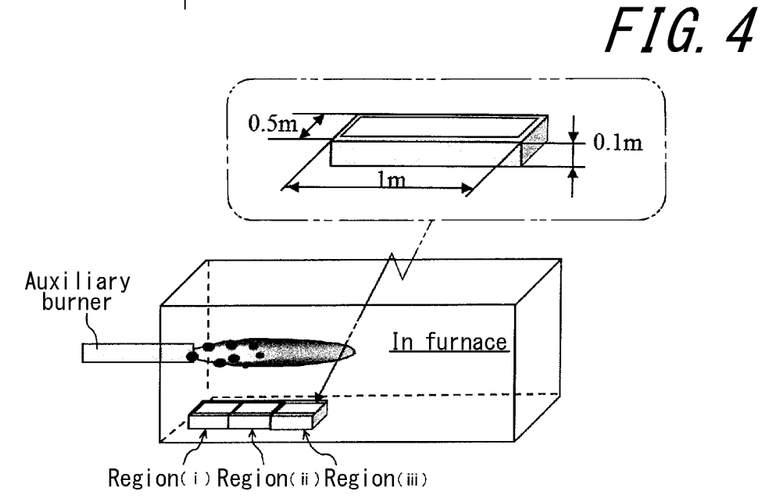
FIG. 4 is an explanatory diagram illustrating a method of an auxiliary burner combustion test performed in examples.

FIG. 4 schematically illustrates the combustion experiment. To measure the combustion rate of the pulverized coal injected from the auxiliary burner, the embers of the pulverized coal after the combustion test (hereafter referred to as "residue") were collected and analyzed. Specifically, the combustion test was performed with a residue collection box placed in the furnace, and the residue accumulated in the residue collection box was collected. The ash content in the residue was determined, and the pulverized coal combustion rate was calculated according to the following Formula:

$$\text{Pulverized coal combustion rate [\%]} = 100 - \frac{(100 - \text{ash}) \times \text{ash}_0/\text{ash}}{100 - \text{ash}_0} \times 100$$

where ash denotes the proportion of the ash content in the residue, and $\text{ash}_0$ denotes the proportion of the ash content in the pulverized coal.

The dimensions of the residue collection box were as follows: 0.5 m in width, 1 m in length, and 0.1 m in height. As illustrated in FIG. 4, three residue collection boxes were arranged in series on the burner axis extension line from the burner front end position. Thus, the residue was collected in each of three separate regions (i) (0 m to 1 m), (ii) (1 m to 2 m), and (iii) (2 m to 3 m) from the burner front end position (0 m) to the position of 3 m on the burner axis extension line, and the pulverized coal combustion rate was calculated based on the residue collected in each region (residue collection box).

In a typical electric furnace, the distance from the burner front end to the scrap is about 0.5 m to 2.5 m. Hence, it is appropriate to evaluate the pulverized coal combustion rate in the regions (i), (ii), and (iii). If the calculated pulverized coal combustion rate is less than 60%, a stable flame is unlikely to form, and misfiring may occur. Accordingly, a pulverized coal combustion rate of 60% or more was set as a rough target. The results are shown in Table 3 and illustrated in FIG. 5.

Moreover, whether or not the burner front end portion was eroded was examined. If the burner front end portion was eroded, the erosion depth was measured, and the proportion of the erosion depth to the diameter of the burner front end portion was calculated. The results are shown in Table 3.

Figure 5:
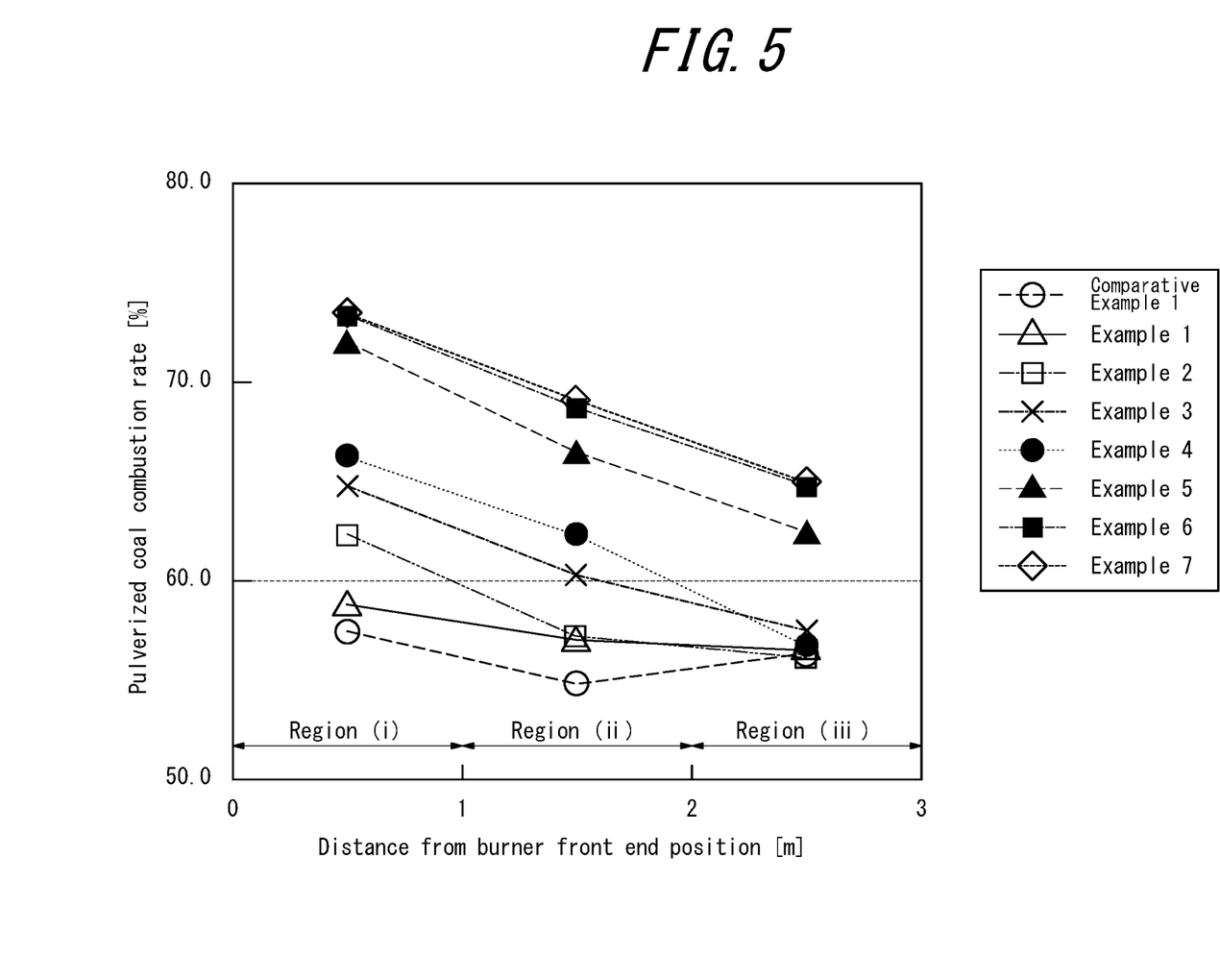
FIG. 5 is a graph illustrating the relationship between the distance from the burner front end position and the pulverized coal combustion rate for each of auxiliary burners of Examples and Comparative Example.

As can be understood from Table 3 and FIG. 5, in the auxiliary burner of Comparative Example 1 (L/D=0) without the first space 4, the pulverized coal combustion rate was low in all of the regions (i) to (iii), and the pulverized coal combustibility was insufficient as a whole. In the auxiliary burners of Examples 1 to 7 having the first space 4, on the other hand, the pulverized coal combustion rate was improved with respect to Comparative Example 1 due to the solid fuel and gas fuel premixing effect in the first space 4, thus exhibiting improved pulverized coal combustibility.

In particular, in the auxiliary burner of Example 3 with L/D=0.6 and the auxiliary burner of Example 4 with L/D=0.8, the pulverized coal combustion rate in each of the regions (i) and (ii) was 60% or more, and the pulverized coal combustion rate was improved by 8.9% at the maximum (region (i) in Example 4) with respect to Comparative Example 1. In the auxiliary burner of Example 5 with L/D=1.0, the pulverized coal combustion rate in each of the regions (i) to (iii) was 60% or more, and the pulverized coal combustion rate was improved by 14.7% at the maximum (region (i)) with respect to Comparative Example 1.

In the auxiliary burner of Example 2 with L/D=0.3, the pulverized coal combustion rate was 60% or more only in the region (i). However, the solid fuel and gas fuel premixing effect in the first space 4 was recognized, and the pulverized coal combustibility was higher than that of Comparative Example 1. In the auxiliary burner of Example 1 with L/D=0.2, the pulverized coal combustion rate was not 60% or more in any of the regions, but the pulverized coal combustion rate was improved with respect to Comparative Example 1 due to the solid fuel and gas fuel premixing effect in the first space 4.

In the auxiliary burner of Example 6 with L/D=1.5 and the auxiliary burner of Example 7 with L/D=1.6, the pulverized coal combustion rate was 60% or more in each of the regions (i) to (iii). The pulverized coal combustion rate was highest of the Examples, and the pulverized coal combustion rate was improved by 16.1% at the maximum (region (i) in Example 7) with respect to Comparative Example 1. Thus, when L/D is higher, the pulverized coal combustibility is likely to be higher. On the other hand, there is a possibility that the burner front end portion is eroded. In Example 6, slight erosion of the burner front end portion was found after the test, with an erosion depth of 2.3% with respect to the diameter of the burner front end portion. In Example 7, too, slight erosion of the burner front end portion was found after the test, with an erosion depth of 3.1% with respect to the diameter of the burner front end portion. In Example 7, the pulverized coal was found to have stuck to the burner front end portion. This is considered to be because, due to excessively high L/D, high-temperature pulverized coal stuck to the front end, facilitating erosion. Erosion of the burner front end portion or adhesion of the pulverized coal hinders maintenance. In terms of ensuring maintenance in addition to a high pulverized coal combustion rate, L/D is preferably 1.5 or less, and more preferably 1.0 or less.

In the auxiliary burners of Examples 1 to 7, the improvement in pulverized coal combustibility was more remarkable on the side closer to the burner. Given that the distance between the auxiliary burner and the scrap in an actual electric furnace is 0.5 m at the shortest, the improvement in pulverized coal combustibility by Examples 1 to 7 is effective in efficiently heating or melting scrap.

The burner output of 600 Mcal/h in this test is the scale installed in an electric furnace of 60 t/ch, and the test was carried out on the actual machine scale. Therefore, it is obvious that the same effect can be expected also in an actual electric furnace.

TABLE 1

| Burner output | 600 Mcal/h |
|---|---|
| Pulverized coal supply amount | 72 kg/h |
| Flow rate of carrier gas of pulverized coal | 5.8 Nm$^3$/h |
| LNG flow rate | 6.2 Nm$^3$/h |
| Pure oxygen flow rate | 152 Nm$^3$/h |

TABLE 2

| Coal type (product name) | MDT |
|---|---|
| Total carbon (mass %) | 81.7 |
| Fixed carbon (mass %) | 76.9 |
| Volatile content (mass %) | 13.4 |
| Ash (mass %) | 9.7 |
| S (mass %) | 0.34 |
| Lower heating value (kcal/kg) | 7511 |
| Particle size d(90) (μm) | 70 |

TABLE 3

| No. | L/D | Pulverized coal combustion rate (%) | | | Erosion depth |
| | | Region (i) | Region (ii) | Region (iii) | % |
|---|---|---|---|---|---|
| Comparative Example 1 | 0 | 57.4 | 54.8 | 56.3 | No erosion |
| Example 1 | 0.2 | 58.8 | 57.0 | 56.5 | No erosion |
| Example 2 | 0.3 | 62.3 | 57.2 | 56.1 | No erosion |
| Example 3 | 0.6 | 64.7 | 60.3 | 57.5 | No erosion |
| Example 4 | 0.8 | 66.3 | 62.3 | 56.7 | No erosion |
| Example 5 | 1.0 | 72.1 | 66.5 | 62.4 | No erosion |
| Example 6 | 1.5 | 73.4 | 68.7 | 64.7 | 2.3 |
| Example 7 | 1.6 | 73.5 | 69.1 | 65.0 | 3.1 |

Second Example

A verification test was performed in an electric furnace with each of the auxiliary burner of Example 4 and the auxiliary burner of Comparative Example 1 in Table 3 (First Example) installed therein. The electric furnace had a furnace diameter of about 6.3 m, a furnace height of about 4.1 m, and a tap capacity of about 120 tons, and was DC type having one electrode at the center. Four auxiliary burners were arranged in the furnace body circumferential direction.

LNG (gas fuel) and pulverized coal (solid fuel) were used as fuels of the auxiliary burner, and pure oxygen was used as combustion-supporting gas. Pulverized coal was injected from the solid fuel injection tube at the center with nitrogen as carrier gas, LNG was injected from the gas fuel injection tube located outside the solid fuel injection tube, and pure oxygen was injected from the combustion-supporting gas injection tube located outside the gas fuel injection tube (i.e. located on the outermost circumference). The output and use conditions of the auxiliary burner are shown in Table 4. The energy ratio of pulverized coal and LNG was set to 90:10 (pulverized coal: LNG). As the pulverized coal, MDT having the components, lower heating value, and particle size shown in Table 2 was used.

The test results were evaluated based on an operation time index and an electric power consumption rate index. The operation time index is an index obtained by dividing the operation time in each test by the average operation time in normal operation. The electric power consumption rate index is an index obtained by dividing the electric power consumption rate in each test by the electric power consumption rate in normal operation. An operation cost advantage is indicated if both indices are less than 1.0. The normal operation refers to operation with an auxiliary burner using only LNG as fuel.

Figure 6:
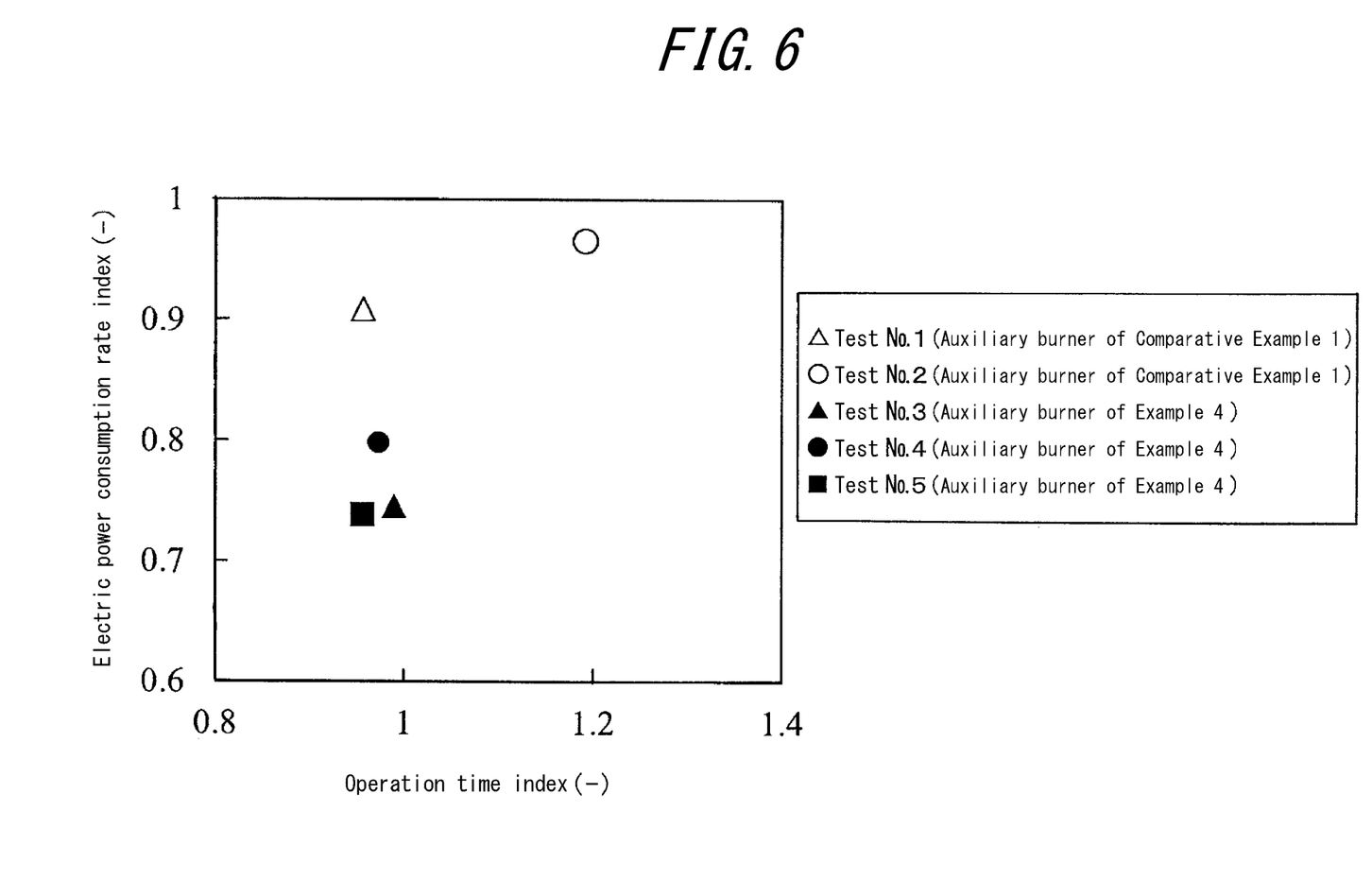
FIG. 6 is a graph illustrating the operation time index and the electric power consumption rate index with respect to normal operation, in a verification test performed in an electric furnace provided with each of auxiliary burners of Example and Comparative Example.

The test results are shown in Table 5 and illustrated in FIG. 6. In Table 5, "excellent", "good", and "poor" are evaluation results based on the indices, where an index of 0.8 or less corresponds to "excellent", an index of more than 0.8 and 1.0 or less corresponds to "good", and an index of more than 1.0 corresponds to "poor".

As can be understood from Table 5 and FIG. 6, in Test No. 1 using the auxiliary burner of Comparative Example 1 (L/D=0) in Table 3, the operation time index was 0.96, and the electric power consumption rate index was 0.91, which are similar to those in the normal operation. In Test No. 2 equally using the auxiliary burner of Comparative Example 1 (L/D=0), however, the operation time index was 1.19, that is, the operation time was longer. This is considered to be because, due to an insufficient pulverized coal combustion rate, the heat efficiency for the scrap decreased, and consequently the operation time increased. Thus, with the auxiliary burner of Comparative Example 1, the combustion of the pulverized coal was unstable, which could cause an increase in operation cost.

In Tests No. 3 to 5 using the auxiliary burner of Example 4 (L/D=0.8) in Table 3, the operation time index was 0.99, 0.97, and 0.96 respectively, i.e. was not very different from Test No. 1. On the other hand, the electric power consumption rate index was 0.75, 0.79, and 0.74 respectively, i.e. was considerably reduced from Test No. 1. This is considered to be because the pulverized coal combustion rate increased and the scrap was heated efficiently. Moreover, there was no increase in operation time, indicating stable combustion.

As is clear from the above description, the auxiliary burner according to the present disclosure can achieve stable combustion of solid fuel and reduce the operation cost. Such an auxiliary burner according to the present disclosure can be used to considerably reduce the cost of melting scrap in an electric furnace.

TABLE 4

| Burner output | 2000 Mcal/h |
|---|---|
| Pulverized coal supply amount | about 240 kg/h |
| Flow rate of carrier gas of pulverized coal | 15 Nm$^3$/h |
| LNG flow rate | 10 Nm$^3$/h |
| Pure oxygen flow rate | 425 Nm$^3$/h |

TABLE 5

| Test No. | Auxiliary burner used | L/D | Operation time index | | Electric power consumption rate index | |
|---|---|---|---|---|---|---|
| 1 | Comparative Example 1 | 0 | 0.96 | Good | 0.91 | Good |
| 2 | Comparative Example 1 | 0 | 1.19 | Poor | 0.97 | Good |
| 3 | Example 4 | 0.8 | 0.99 | Good | 0.75 | Excellent |
| 4 | Example 4 | 0.8 | 0.97 | Good | 0.79 | Excellent |
| 5 | Example 4 | 0.8 | 0.96 | Good | 0.74 | Excellent |

INDUSTRIAL APPLICABILITY

The auxiliary burner for an electric furnace according to the present disclosure has high iron scrap heating effect by efficiently burning a solid fuel together with a gas fuel at a high combustion rate.

REFERENCE SIGNS LIST

100 Auxiliary burner for electric furnace
1 Solid fuel injection tube
2 Gas fuel injection tube
3 Combustion-supporting gas injection tube
4 First space
5 Second space
7 Furnace body
8 Electrode
x Iron scrap
10 Solid fuel flow path (first flow path)
11 Solid fuel discharge port
12 Solid fuel supply port
20 Gas fuel flow path (second passage)
21 Gas fuel discharge port
22 Gas fuel supply port
30 Combustion-supporting gas flow path (third flow path)
31 Combustion-supporting gas discharge port
32 Combustion-supporting gas supply port
1A Front end of solid fuel injection tube
2A Front end of gas fuel injection tube
3A Front end of combustion-supporting gas injection tube
L Length of first space in burner axis direction
D Discharge port diameter of solid fuel injection tube

The invention claimed is:

1. An auxiliary burner for an electric furnace for manufacturing molten iron by melting iron scrap, which is attached to the electric furnace and uses a gas fuel and a solid fuel as fuel, comprising:
   a solid fuel injection tube defining a first flow path through which the solid fuel passes and configured to inject the solid fuel from a tip of the first flow path;
   a gas fuel injection tube arranged coaxially around the solid fuel injection tube, defining a second flow path through which the gas fuel passes between the gas fuel injection tube and an outer wall of the solid fuel injection tube, and configured to inject the gas fuel from a tip of the second flow path; and
   a combustion-supporting gas injection tube arranged coaxially around the gas fuel injection tube, defining a third flow path through which a combustion-supporting gas passes between the combustion-supporting gas injection tube and an outer wall of the gas fuel injection tube, and configured to inject the combustion-supporting gas from a tip of the third flow path,
   wherein a front end of the solid fuel injection tube is located inside the gas fuel injection tube to form, between the front end of the solid fuel injection tube and a front end of the gas fuel injection tube, a first space for solid fuel and gas fuel premixing surrounded by a front end portion of the gas fuel injection tube.

2. The auxiliary burner for an electric furnace according to claim 1,
   wherein 0.2≤L/D≤1.5, where L is a length of the first space in a burner axis direction, and D is a discharge port diameter of the solid fuel injection tube.

3. The auxiliary burner for an electric furnace according to claim 1,
   wherein the front end of the gas fuel injection tube is located inside the combustion-supporting gas injection tube to form, between the front end of the gas fuel injection tube and a front end of the combustion-supporting gas injection tube, a second space for flame holding surrounded by a front end portion of the combustion-supporting gas injection tube.

4. An electric furnace comprising
   a furnace body;
   an electrode placed in the furnace body; and
   the auxiliary burner according to claim 1 attached to the furnace body.

5. A method of producing molten iron, the method comprising:
   melting iron scrap in an electric furnace including a furnace body, an electrode placed in the furnace body, and the auxiliary burner according to claim 1 attached to the furnace body, to obtain molten iron.

6. The auxiliary burner for an electric furnace according to claim 2,
   wherein the front end of the gas fuel injection tube is located inside the combustion-supporting gas injection tube to form, between the front end of the gas fuel injection tube and a front end of the combustion-supporting gas injection tube, a second space for flame holding surrounded by a front end portion of the combustion-supporting gas injection tube.

7. An electric furnace comprising
   a furnace body;
   an electrode placed in the furnace body; and
   the auxiliary burner according to claim 2 attached to the furnace body.

8. An electric furnace comprising
   a furnace body;
   an electrode placed in the furnace body; and
   the auxiliary burner according to claim 3 attached to the furnace body.

9. An electric furnace comprising
   a furnace body;
   an electrode placed in the furnace body; and
   the auxiliary burner according to claim 6 attached to the furnace body.

10. A method of producing molten iron, the method comprising:
    melting iron scrap in an electric furnace including a furnace body, an electrode placed in the furnace body, and the auxiliary burner according to claim 2 attached to the furnace body, to obtain molten iron.

11. A method of producing molten iron, the method comprising:
    melting iron scrap in an electric furnace including a furnace body, an electrode placed in the furnace body, and the auxiliary burner according to claim 3 attached to the furnace body, to obtain molten iron.

12. A method of producing molten iron, the method comprising:
    melting iron scrap in an electric furnace including a furnace body, an electrode placed in the furnace body, and the auxiliary burner according to claim 6 attached to the furnace body, to obtain molten iron.

* * * * *